United States Patent
Takano et al.

(10) Patent No.: US 6,279,532 B1
(45) Date of Patent: *Aug. 28, 2001

(54) FUEL PRESSURE CONTROL APPARATUS FOR CYLINDER INJECTION ENGINE

(75) Inventors: Yoshiya Takano; Koji Matsufuji, both of Hitachinaka; Tohru Ishikawa, Kitaibaraki; Takao Teranishi, Hitachi, all of (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/114,287

(22) Filed: Jul. 13, 1998

(30) Foreign Application Priority Data

Jul. 15, 1997 (JP) .................................................... 9-189576

(51) Int. Cl.⁷ ...................................................... F02D 31/00
(52) U.S. Cl. ............................ 123/357; 123/458; 123/497
(58) Field of Search .................................. 123/357, 497, 123/514, 456, 458

(56) References Cited

U.S. PATENT DOCUMENTS

| | | | |
|---|---|---|---|
| 4,791,905 | * 12/1988 | Furuta ................................. | 123/497 |
| 4,982,331 | * 1/1991 | Miyazaki ............................ | 123/357 |
| 5,074,272 | 12/1991 | Bostick ............................... | 123/514 |
| 5,121,604 | 6/1992 | Berger et al. ........................ | 60/602 |
| 5,261,378 | * 11/1993 | Fenchel .............................. | 123/357 |
| 5,313,923 | * 5/1994 | Takeuchi ............................ | 123/497 |
| 5,327,872 | 7/1994 | Morikawa ........................... | 123/516 |
| 5,379,741 | 1/1995 | Matysiewicz ....................... | 123/497 |
| 5,441,026 | 8/1995 | Akimoto ............................. | 123/198 |
| 5,483,940 | * 1/1996 | Namba ............................... | 123/497 |
| 5,642,716 | * 7/1997 | Ricco . | |
| 5,694,902 | * 12/1997 | Miwa .................................. | 123/497 |
| 5,771,861 | * 6/1998 | Musser ............................... | 123/357 |
| 5,937,829 | * 8/1999 | Endou ................................ | 123/497 |

FOREIGN PATENT DOCUMENTS

| | | |
|---|---|---|
| 44 43 836 | 6/1996 | (DE) . |
| 196 40 826 | 4/1997 | (DE) . |
| 0 780 559 | 6/1997 | (EP) . |
| 2 730 526 | 8/1996 | (FR) . |
| 4-339143 | 11/1992 | (JP) . |
| 5-149168 | * 6/1993 | (JP) . |
| 9-4498 | * 1/1997 | (JP) . |

* cited by examiner

Primary Examiner—Carl S. Miller
(74) Attorney, Agent, or Firm—Evenson, McKeown, Edwards & Lenahan, P.L.L.C.

(57) ABSTRACT

A fuel pressure control apparatus for cylinder injection engine having a fuel injection valve for injecting fuel into a cylinder of an engine, a pipe for conducting the fuel to the fuel injection valve, a fuel pump for supplying the fuel from a fuel supply system to the pipe, a fuel pressure regulator for regulating the fuel pressure within the pipe by discharging the fuel from the pipe to the fuel supply system, and a control unit for making feed-back control on the fuel pressure within the pipe by applying a control signal determined on the basis of an engine operation parameter to the fuel pressure regulator, wherein the fuel pressure regulator is controlled in a feed-forward manner by a predetermined control value so as to make better fuel pressure control at the time of start and when the fuel pressure transiently changes.

35 Claims, 15 Drawing Sheets

FUEL PRESSURE CONTROL APPARATUS FOR CYLINDER INJECTION ENGINE

BACKGROUND OF THE INVENTION

The present invention generally relates to fuel pressure control apparatus for cylinder injection engine, and particularly to a fuel pressure control apparatus for cylinder injection engine which is suited to control the fuel pressure in the range from the start of engine to the stationary state, the fuel pressure at the time of the transient from the stationary state, and the fuel pressure at the time when fuel is cut.

The conventional fuel pressure control apparatus for cylinder injection engine has a high-pressure fuel pump to be driven by engine, and a low-pressure fuel pump provided on the upper stream side of the high-pressure fuel pump in order that the high-pressure fuel can be directly injected into combustion chambers through high-pressure fuel injection valves that are provided in the respective combustion chambers of the engine. In addition, the fuel pressure in the pipes at the high-pressure fuel injection valves is controlled by fuel pressure adjusting means which makes feed back control so that the actual fuel pressure measured by fuel pressure detecting means can be coincident with a target value that is optimum to the engine speed.

In this conventional fuel pressure control apparatus for cylinder injection engine, however, since the fuel pressure is always under the feed-back control, the discharge pressure of the fuel pump driven by the engine is greatly affected by the cranking speed of engine and combustion state. Particularly, at the time of start, it is difficult to control the fuel pressure by feed back. Even if the feed back control is carried out, hunting or the like is caused to make the fuel pressure control the more unstable.

An example of the fuel pressure control apparatus with the above drawback removed is proposed as for example disclosed in JP-A-5-149168. In this proposed technique, different fuel pressure control systems are respectively used at the start when the discharge pressure of the high-pressure fuel pump driven by engine is unstable and at the normal driving condition. In this case, an actual fuel pressure signal is supplied to a fuel pressure regulator of the high-pressure fuel system, and a control system makes feed-back control in order to cause the actual fuel pressure value to coincide with a target fuel pressure value. This control system includes start discriminating means for deciding whether the engine starts, and fuel pressure control extent calculating means which supplies a fuel pressure signal for that control extent according to the target fuel pressure value when the engine starts.

In the above fuel pressure control apparatus, at the normal driving time, or only when the discharge pressure of the pump based on the engine rotation is stable, the fuel pressure is controlled in a feed-back manner, while at the start when the discharge pressure of the pump is unstable the fuel pressure is controlled in a feed-forward manner by a fuel pressure signal according to only the target fuel pressure value as a fixed amount of control, thereby stabilizing the fuel pressure control.

However, this conventional fuel pressure control apparatus is constructed to stop the feed back control when the fuel pressure in the pipes at around the fuel injection valves is most greatly changed, or at the start time. When the engine starts at a low temperature, the voltage of the battery as a driving power supply is reduced, sometimes making even the operation for driving the feed-forward control unstable. Thus, even if the fuel pressure in the pipes at around the fuel injection valves is controlled in a feed-forward manner by the fuel pressure signal according to only the target fuel pressure value as a fixed amount of control, it is not possible to assure the stabilization of the fuel pressure control at the time of start. In addition, at the time of start, it is necessary to raise the fuel pressure in the pipes at around the fuel injection valves as soon as possible, and make the following control operation. The above proposed technique does not consider these points.

Moreover, it is necessary that the fuel pressure feed-back control consider the change of the target fuel pressure of engine due to the abrupt change of driving conditions at the transient or the like. In other words, when the target value is abruptly changed, or when the fuel pressure is, for example, instantaneously increased and then decreased, a proper amount of control for feed back is not given, so that the actual fuel pressure sometimes overshoots or undershoots. These defects will be ascribed to the control ability in transients. The above proposed technique considers neither the detailed control to take when the target fuel pressure is suddenly changed, nor the detailed method of setting the amount of reference control as the amount of feed-forward control.

Moreover, in this type of fuel pressure control apparatus, foreign matter such as abrasion powder or dust enters into the pipes or the regulator of fuel pressure control means, causing troubles in the pipes and control equipment. The foreign matter must be removed from those places.

SUMMARY OF THE INVENTION

It is an object of the invention to provide a fuel pressure control apparatus for cylinder injection engine of the type in which a fuel pressure signal is supplied to the fuel pressure control means of the high pressure fuel system, controlling the actual fuel pressure to be coincident with a target fuel pressure value by feed-back control, wherein the fuel pressure control at the time of start and the fuel pressure control at the time of transients such as sudden change of target fuel pressure can be improved, and alien substances can be prevented from entering into the fuel supply system and pipes.

According to the invention, to achieve the object, there is provided a fuel pressure control apparatus of cylinder injection engine having a fuel pump, fuel injection valves, a pipe system connecting the fuel pump and the fuel injection valves, and a fuel pressure regulator provided in the pipe system and which discharges fuel from the pipe system to thereby adjust the fuel pressure, the fuel pressure regulator being controlled to stop discharge of fuel from the pipe system for a predetermine time from the start of engine.

A more specific example of the above fuel pressure control apparatus has fundamental duty calculating means, target fuel pressure calculating means, actual fuel pressure calculating means, fuel pressure correction calculating means, fundamental duty correcting means, and output duty calculating means, wherein the output duty calculating means controls the output duty value to the fuel pressure regulator to be zero for a predetermined time from when the start of engine is detected.

Since the above construction of the invention controls the discharge of fuel from the pipe system to stop without supplying an amount of control to the fuel pressure regulator when the engine starts, the fuel fed into the fuel pipes from the fuel pump is not discharged so that the pressure within the pipes can be fast increased, with the result that fuel can be injected stably at the time of engine start. That is, at the time of engine start the fuel pipe system discharges only the necessary fuel to be injected from the fuel injection valves, and is closed at the other time. Since the closed space can be formed only by closing the pressure control opening of the fuel pressure regulator without electric energy, the effect of power supply voltage or the like can be avoided, and the pressure in the pipes can be increased fastest.

In addition, in the above fuel pressure control apparatus, the fundamental duty calculating means computes a fundamental duty value on the basis of a load signal to the engine and revolution rate of engine, and the fuel pressure correction calculating means calculates a fuel pressure control deviation and a duty correction value on the basis of the target fuel pressure and actual fuel pressure, and decides whether feed-back control is permitted. The fundamental duty value is corrected according to the duty correction value and supplied to the output duty calculating means. The output duty calculating means, at the time of start, selectively makes the closing control of the fuel pressure regulator, feed-forward control or feed-back control on the basis of the battery voltage or a signal for fuel cut or the like.

Also, according to another embodiment of the fuel pressure control apparatus for cylinder injection engine of the invention, the fuel pressure regulator is controlled to keep the fuel discharge opening in a certain state for a constant time after a certain time has elapsed from the start of engine, and then controlled in a feed-back manner so that the actual fuel pressure reaches the target fuel pressure. In other words, after a predetermined time has elapsed from when the start of engine is detected, the output duty value to the fuel pressure regulator is controlled to be constant for a constant time, and then the fuel pressure correction value calculating means makes feed-back control so that the actual fuel pressure can reach the target value.

According to another embodiment of the invention, when the target fuel pressure to be determined by driving conditions is changed by a predetermined amount, the feed-back control is stopped, and the fuel pressure is controlled on the basis of the amount of feed-back at that time and the reference amount of control that depends on that driving conditions, and then placed under the feed-back control after the target fuel pressure and actual fuel pressure continue to be maintained in certain ranges for a predetermined time under the reference amount of control.

Thus, according to the invention, when the target fuel pressure is suddenly changed, for example instantaneously increased and then decreased, the feed-back control is stopped, and the fuel pressure is controlled in a feed-forward manner on the basis of not only the reference duty value (reference amount of control) but also the amount of feed back indicated when the feed-back control is stopped in order to absorb the scattering, thereby improving the ability of control at the transient time. In addition, when the feed-back control resumes, the fuel in the pipes is stable, and thus the actual fuel pressure can be well converged.

Moreover, when the feed-back control is started, decision is made of whether the actual fuel pressure is in a given range or not. If it is out of the range, occurrence of some trouble is detected, and the feed-back control can be inhibited. Here, whether it is in a certain range or not is decided by the maximum deviation of scattering on the basis of the temperature and voltage of the fuel pressure regulator, and its deterioration with time.

According to still another embodiment of the fuel pressure control apparatus of the invention, the fuel pressure regulator is controlled to cause the pipe system to discharge the maximum fuel under the condition that the fuel injection valves are controlled to inject the minimum amount of fuel including no injection. In other words, the output calculating means controls the output duty to the fuel regulator to be 100% under the condition that the fuel injection valves are controlled to inject the minimum amount of fuel including no injection.

According to another preferred embodiment of the invention, when the injection valves are released from the minimum injection control including non-injection, a certain amount of control is added to the amount of control calculated on the basis of feed-back control.

Thus, according to the invention, when the fuel injection valves are placed under the minimum injection control including non-injection, for example, when the accelerator pedal is released, the area of the opening of the fuel pressure regulator can be maximized, thus making it possible to positively remove the foreign matter such as abrasion powder or dust collected within the pipe system and fuel pressure regulator.

When the area of the opening is the maximum under the driving state, the pipe system generally increases discharge gas to reduce the fuel pressure to a predetermined value or below, but under the fuel cut state, the reduction of the pressure within the pipe system has no effect. In addition, since at the time of recovery it is necessary to swiftly return to a preset pressure, a certain amount of control offset is given, and fuel control is made to fast stabilize the fuel pressure.

DESCRIPTION OF THE PREFERRED EMBODIMENTS

One embodiment of the fuel pressure control apparatus for cylinder injection engine according to the invention will be described in detail with reference to the accompanying drawings.

Figure 1:
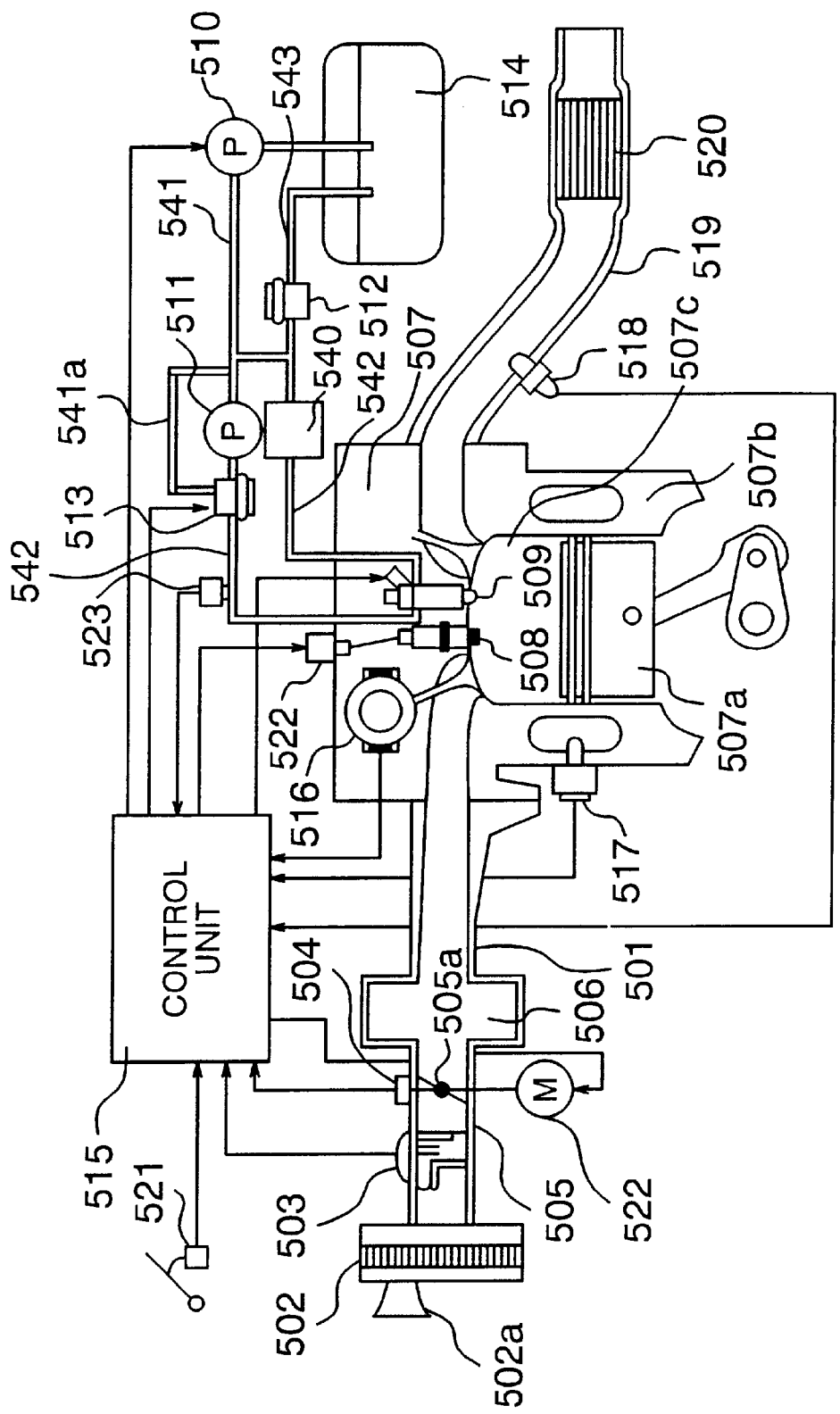
FIG. 1 is a general view of a cylinder injection engine having a fuel pressure control apparatus of one embodiment of the invention.
Figure 2:
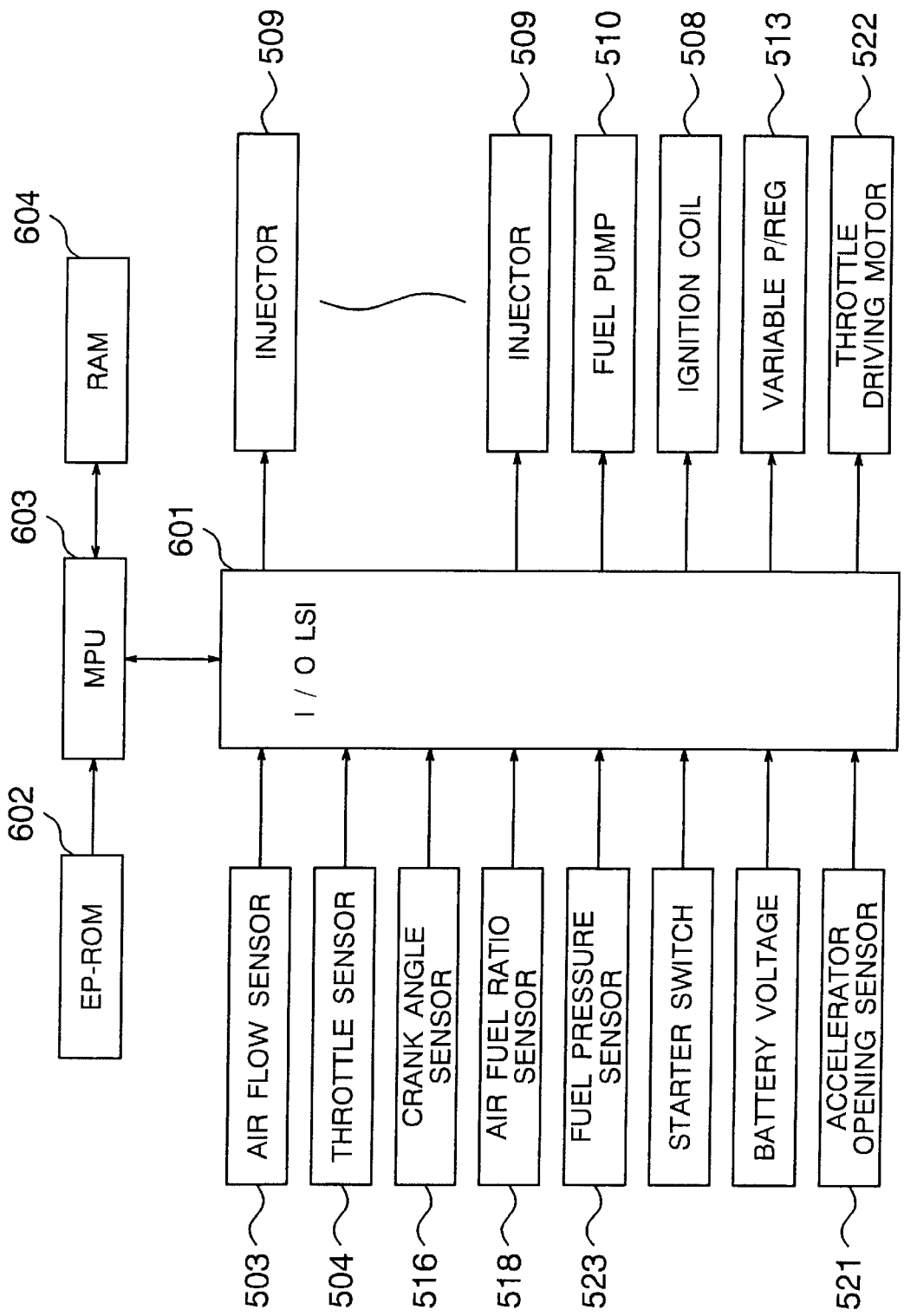
FIG. 2 is a block diagram of an example of the control unit shown in FIG. 1.

FIG. 1 shows the whole construction of an engine system including this embodiment of the fuel pressure control apparatus for cylinder injection engine. Referring to FIG. 1, there is shown an engine 507 that is composed by each cylinder including a piston 507a, a cylinder 507b and a combustion chamber 507c formed by the piston 507a and cylinder 507b, and by an inlet pipe 501 and exhaust pipe 519 provided above the combustion chamber 507c to be connected to the chamber.

The air to be sucked into the engine 507 is introduced from an inlet 502a of an air cleaner 502, and fed through an air flow sensor 503 and through a throttle body 505 having a throttle valve 505a housed for controlling the sucked air flow to a collector 506. The air in the collector 506 is distributed into the inlet pipes 501 which are respectively connected to the cylinders 507b of the engine 507, and fed to each cylinder 507b. The throttle valve 505a can be opened and closed by a motor 522. The exhaust gas after combustion from the combustion chamber 507c is discharged through the exhaust pipe 519 and a catalyst 520.

On the other hand, fuel such as gasoline from a fuel tank 514 is subjected to a first pressure by a fuel pump 510 and supplied to a pipe 541. In addition, the fuel in the pipe is subjected to a second pressure by a fuel pump 511, and fed to a pipe 542. This pipe 542 is composed by two up and down pipes between which an injector 509 is interposed to form a fuel pipe system. The fuel subjected to the first pressure by the fuel pump 510 and fed to the pipe 541 is adjusted to be kept at a constant pressure (for example, 3 kg/cm$^2$) by a fuel pressure regulator 512, and it is secondly pressed by the fuel pump 511 to be raised to a higher pressure, and fed to the pipe 542. The fuel fed to the pipe 542 is adjusted to be at a constant pressure (for example, 70 kg/cm$^2$ by a fuel pressure regulator 513, and injected into the cylinder 507b from the injector 509 that is provided in each cylinder 507b of the engine 507.

In addition, the fuel pressure within the pipe 542 between the fuel pump 511 and the injector 509 is fundamentally controlled by the fuel pressure regulator 513. If an amount of control is not supplied to this fuel pressure regulator 513, or if the control system is disabled, a mechanical regulator 540 is instead operated to adjust.

The fuel injected from the injector 509 is ignited by an ignition coil 508 in response to an ignition signal boosted to a high voltage by an ignition coil 522.

The air flow sensor 503 generates a signal indicating a sucked air flow, and supplies it to a control unit 515. The throttle body 505 has a throttle sensor 504 mounted to detect the degree of opening of the throttle valve 505a. The output signal from the sensor is also supplied to the control unit 515.

A crank angle sensor 516 mounted on a cam shaft (not shown) of the engine 507 generates a reference angle signal REF indicating the rotational position of the crankshaft and an angle signal POS for detecting a rotation signal (revolution rate) signal, and also supplies them to the control unit 515.

On the upstream side of the catalyst 520 of the exhaust pipe 519, there is disposed an A/F sensor 518. An accelerator opening sensor 521 is also provided in the engine 507. The signals from these sensors are also supplied to the control unit 515.

The main portion of the control unit 515 is formed by an MPU, a ROM, a RAM, an I/O LSI including an A/D converter, and so on. The control unit receives the signals from the above-mentioned sensors which detect the driving conditions of the engine, executes predetermined computing processes, generates various different control signals as a result of the calculation, and supplies certain control signals to the injector 509 and ignition coil 522, thus making fuel supply control and ignition timing control.

Figure 3:
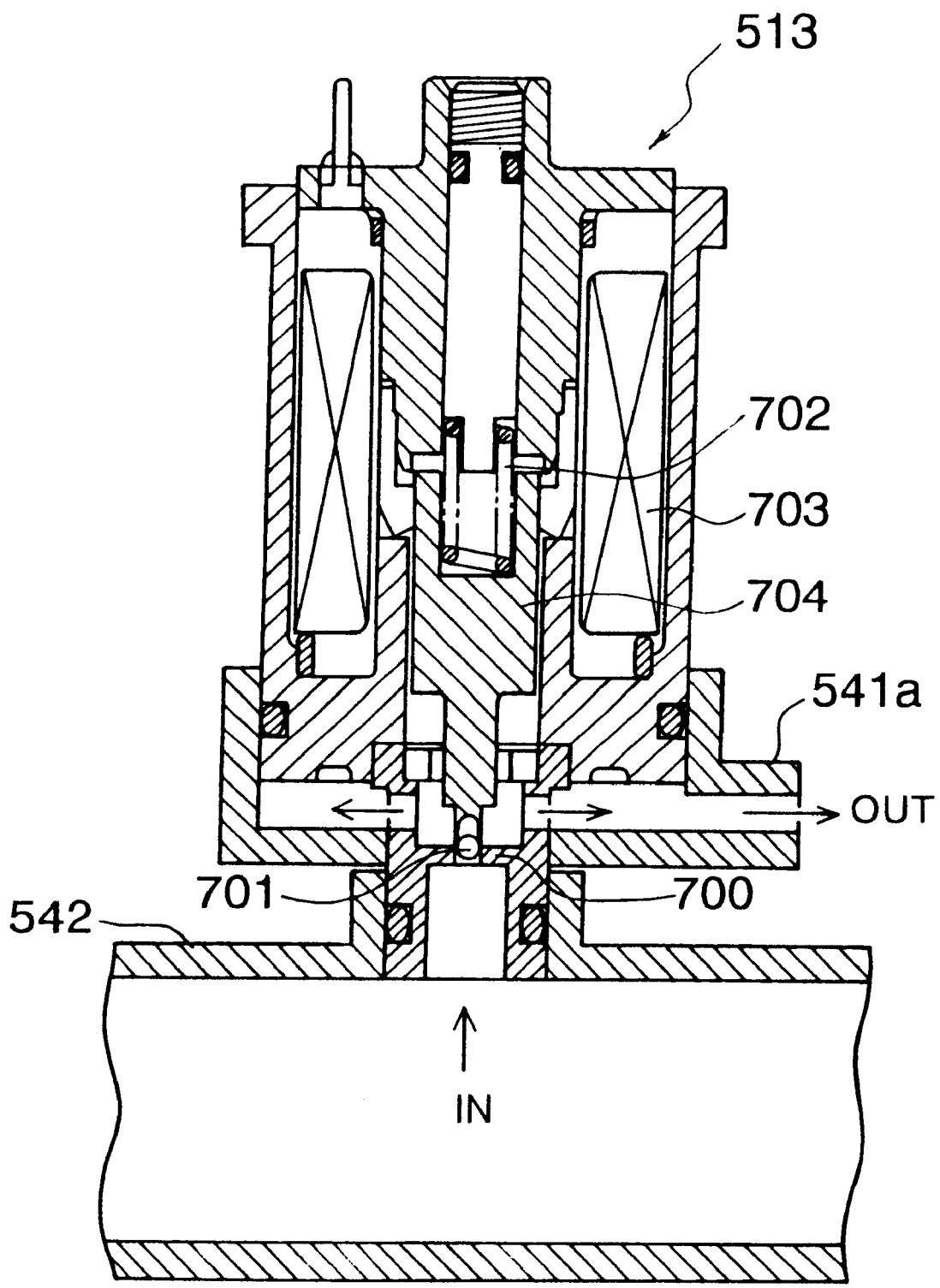
FIG. 3 is a longitudinal cross-sectional diagram of one example of the construction of the variable fuel pressure regulator shown in FIG. 1.

Particularly as to the pressure control, the fuel pressure sensor 523 detects the pressure within the pipe 542 and supplies the control signal to the fuel pressure regulator, or variable pressure/regulator (variable P/Reg) 513. This control signal controls the time in which the valve of the variable P/Reg 513 is opened, or the duty value indicating the ratio of the valve-open time to the valve-closed time. FIG. 3 is a longitudinal cross-sectional view of the variable P/Reg 513. The fuel within the pipe 542 enters into the variable P/Reg 513 from the IN side shown in FIG. 3, and discharged into the pipe 541a on the OUT side shown in FIG. 3, or fed back to the pipe 541. When no control signal is supplied to the variable P/Reg 513 from the control unit 515, a ball valve 701 of the variable P/Reg 513 is pressed against a valve seat 700 by a spring 702, and the fuel from the IN side of the pipe 542 is not discharged to the pipe 541a side. Since the fuel is not discharged from the pipe 542, the pressure within the pipe 542 is determined by the amount of fuel discharged from the fuel pump 511 and the amount of fuel injected by the injector 509. However, the maximum pressure within the pipe 542 is limited by the mechanical regulator 540.

Figure 4:
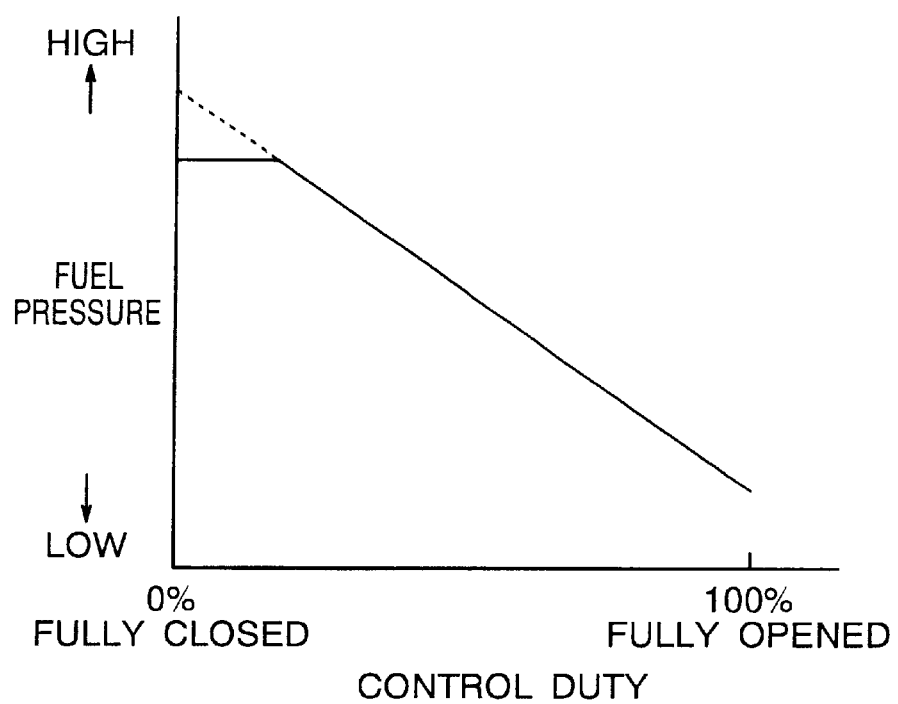
FIGS. 4 and 5 are graphs showing characteristics of the variable fuel pressure regulator.

The amount that the ball valve 701 is controlled by the variable P/Reg 513 is adjusted by the duty value supplied as the duty signal to an electromagnetic coil 703 from the control unit 515. In other words, the sucking force of a plunger 704 which supports the ball valve 701 is controlled by the average current of the electromagnetic coil 703 so as to control the amount of fuel escaped from the valve seat 700. Thus, the actual pressure within the pipe 542 can be controlled to reach the target fuel pressure. FIG. 4 is a graph showing a fundamental characteristic of the variable P/Reg 513, in which the ordinate indicates the fuel pressure within the pipe 542. If the duty value is 0%, or if the amount of control is zero, the pressure within the pipe 542 becomes high since there is no escape fuel. However, the upper limit of the pressure is suppressed by the mechanical regulator 540. If the duty value increases, the escape fuel from the pipe 542 increases, thus reducing the pressure as shown in the graph.

Figure 5:
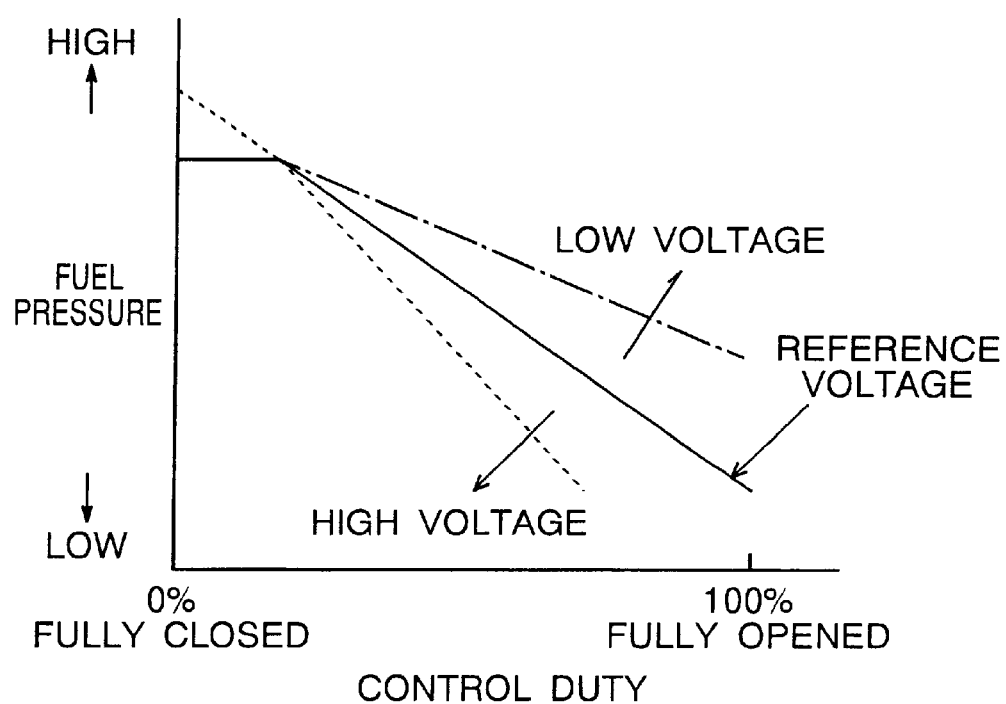

FIG. 5 shows a typical example of the voltage characteristic of the variable P/Reg 513. From FIG. 5, it will be seen that if the driving voltage, or battery voltage is changed, the driving current is changed even under constant duty so that the fuel pressure varies. Thus, it will be understood that the variation of the battery voltage can be compensated by changing the duty value.

Figure 6:
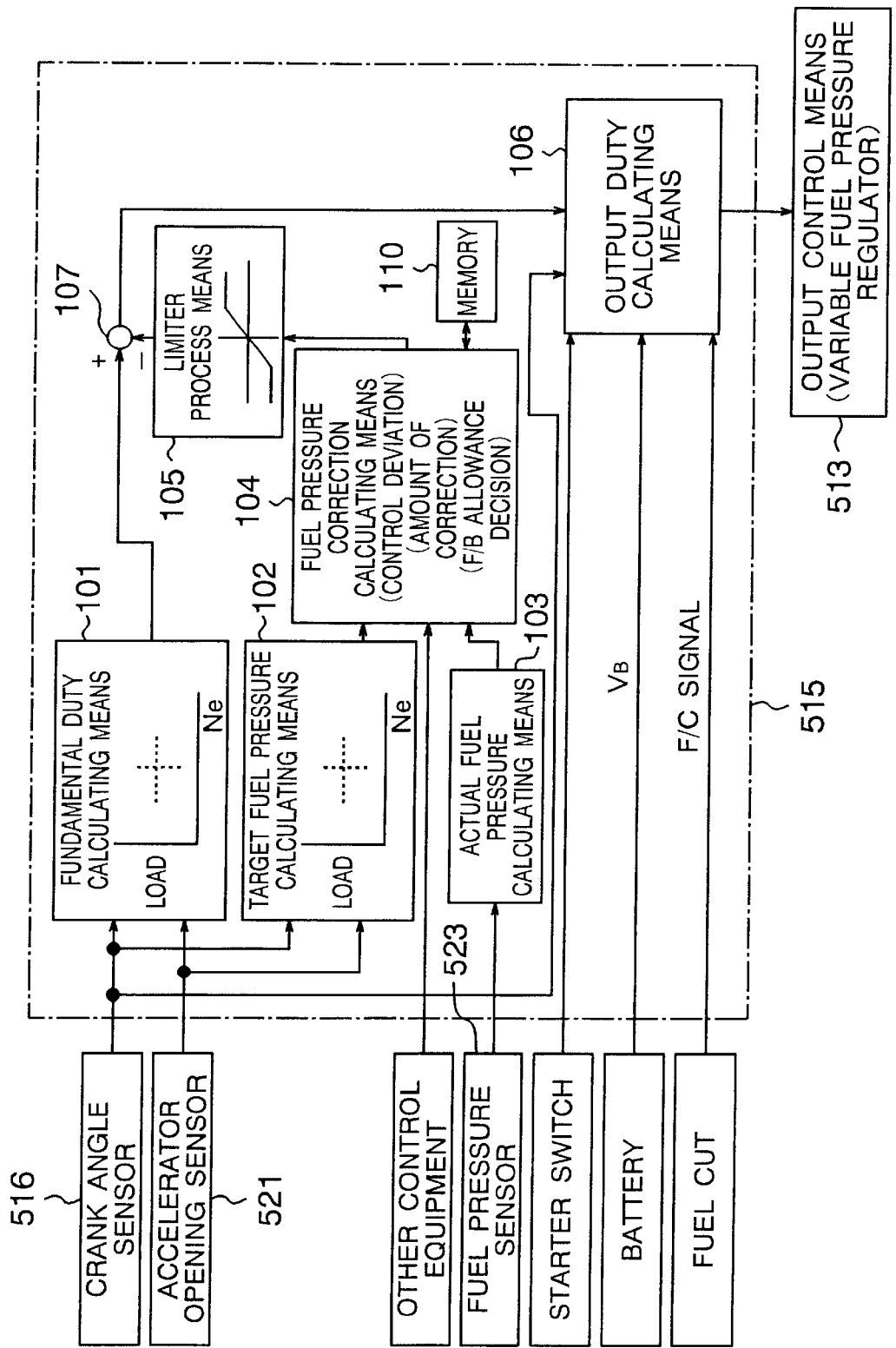
FIG. 6 is a block diagram of the control unit of FIG. 1 showing the concept of the fuel pressure control operation.

FIG. 6 is a block diagram showing the control operation to be executed by the control unit 515.

Fundamental duty calculating means 101 calculates an engine revolution rate Ne from the detected signal which it receives from the crank angle sensor 516, and an engine load T from the detected signal which it receives from the accelerator opening sensor 521, and determines the fundamental duty value for controlling the variable P/Reg 513 on the basis of those calculated values. Target fuel pressure calculating means 102 also determines the target fuel pressure from the engine revolution rate Ne and the engine load T. Actual fuel pressure calculating means 103 converts the received detected value from fuel pressure sensor 523 into an actual fuel pressure.

Fuel pressure correction calculating means 104 compares the target fuel pressure from the target fuel pressure calculating means 102 and the actual fuel pressure from the actual fuel pressure calculating mean 103 to produce a deviation between both, and calculates an amount of fuel pressure correction on the basis of that deviation. The fuel pressure correction calculating means 104 also confirms if the target fuel pressure value is in a predetermined range and decides if the feed-back control can be permitted.

Limiter process means 105 sets the upper and lower limits of the amount of fuel correction calculated by the fuel pressure correction calculating means 104. Fundamental duty correction means 107 corrects the fundamental duty value from the fundamental duty calculating means 101 on the basis of the amount of fuel pressure correction from the limiter means 105, and produces a corrected duty value.

Output duty calculating means 106 decides if the driving state of engine is starting or at the time of F/C (fuel cut). The output duty calculating means 106 corrects the amount of control (duty value) to be applied to the variable P/Reg 513 in accordance with the driving voltage, and produces the corrected amount of control, since the duty-fuel pressure characteristic is changed with the driving voltage fed to the variable P/Reg 513 as shown in FIG. 5.

The operation of this embodiment will be further described in detail with reference to FIG. 6.

Figure 7:
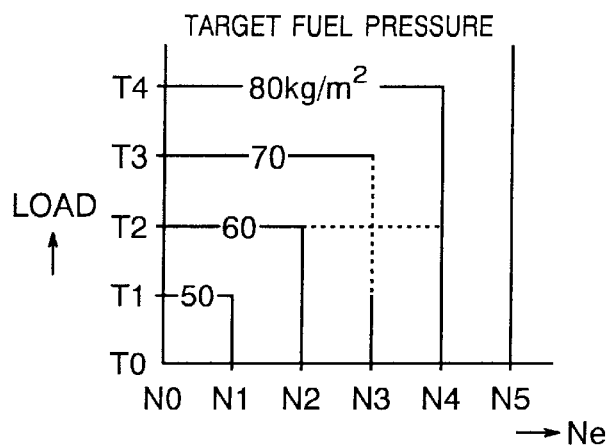
FIG. 7 is a target fuel pressure map diagram of the target fuel pressure control means shown in FIG. 6.
Figure 8:
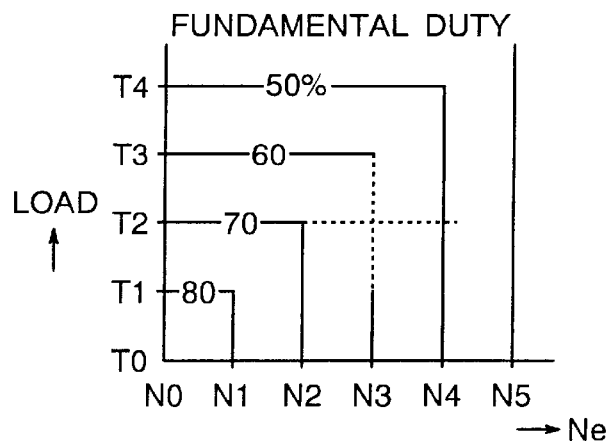
FIG. 8 is a fundamental duty map diagram of the fundamental duty calculating means shown in FIG. 6.

FIG. 7 shows a target fuel pressure map for reading a target fuel pressure on the basis of the engine revolution rate Ne and the load torque T. The load torque is computed by the well-known method on the basis of the detected signals from the accelerator opening sensor 521, air flow sensor 503, throttle sensor 504 and air-fuel ratio sensor 518. The accelerator opening sensor 521 of these sensors is typically shown in FIG. 6. The target fuel pressure calculating means 102 reads out the target fuel pressure value with reference to FIG. 7 on the basis of the engine revolution rate Ne and load torque T. FIG. 8 is a fundamental duty map for reading out the fundamental duty value by the fundamental duty calculating means 102 on the basis of the engine revolution rate Ne and load torque T as in FIG. 7. Although the load axis is represented by torque in FIGS. 7 and 8, the load axis in the target fuel pressure map and fundamental duty map may be shown as in FIG. 9 by the amount of fuel, q which has a close mutual relation with the degree of accelerator opening and which is injected from the injector 509.

Figure 10:
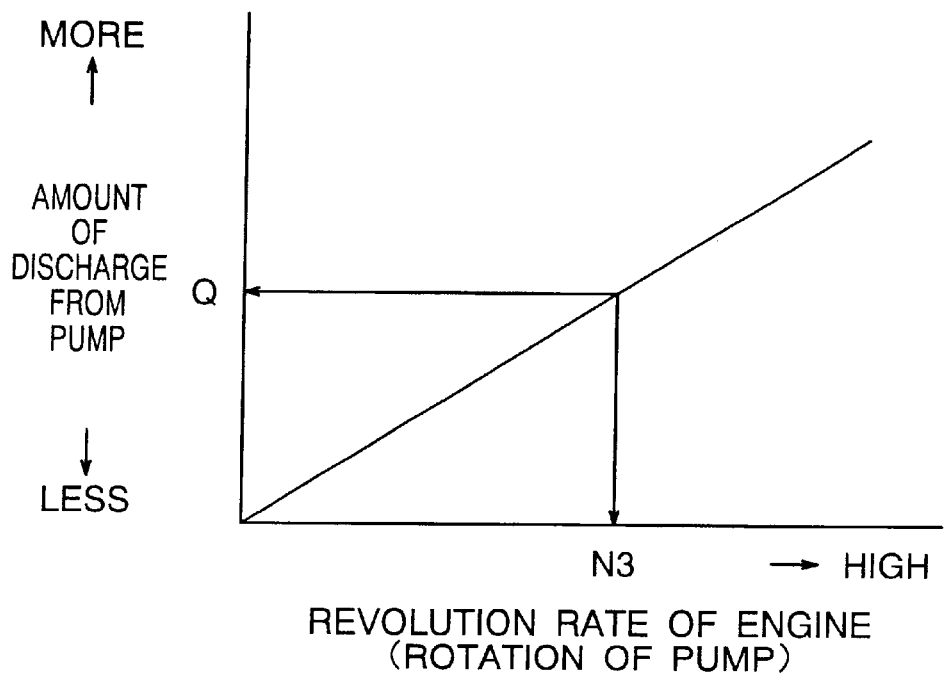
FIG. 10 is a graph showing a characteristic of the fuel pump shown in FIG. 1.

According to one embodiment of the invention, the fuel pump 511 is driven directly by the engine. As shown in FIG. 10, the amount of fuel discharged from the pump 511 is proportional to the revolution rate of engine, Ne, or the revolution rate of the pump. At the operating point indicated in FIG. 10, the amount of fuel discharged from the pump is represented by Q when the revolution rate of the engine is N3.

Figure 9:
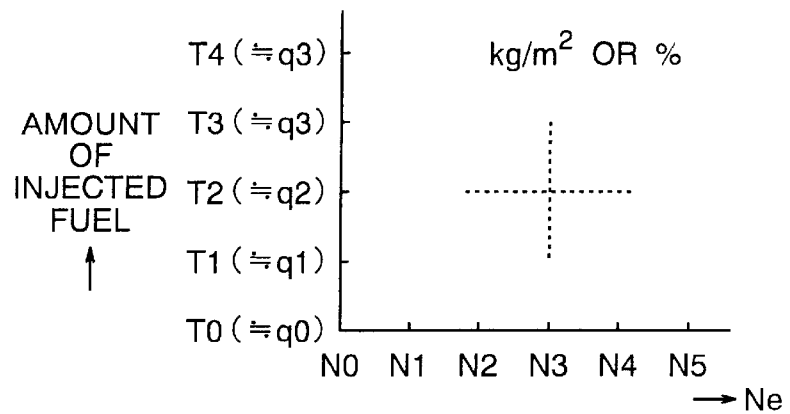
FIG. 9 is a map diagram of another example of those shown in FIGS. 7 and 8.
Figure 11:
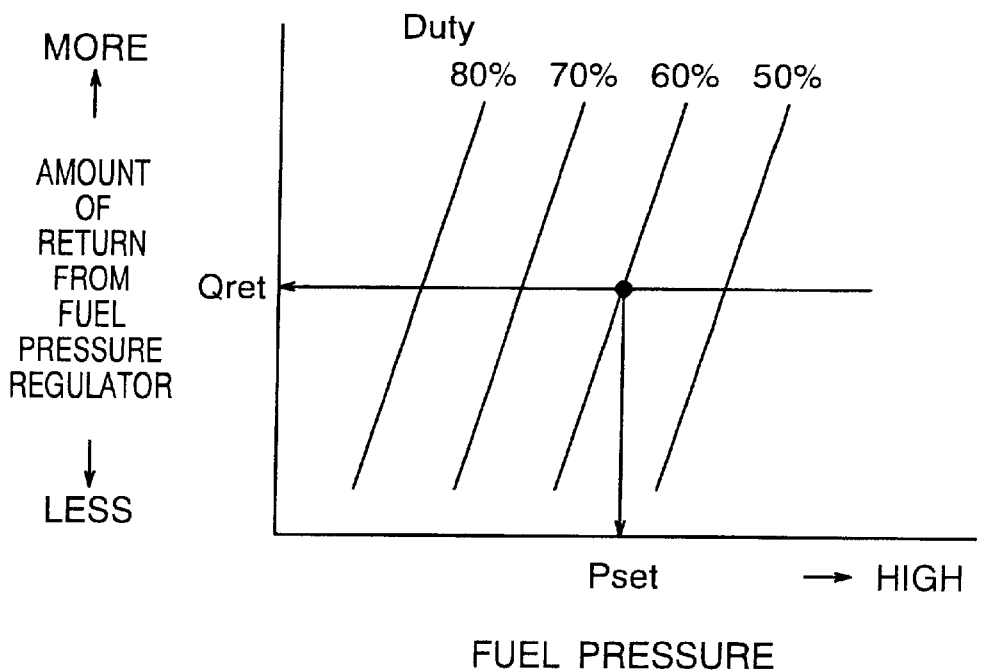
FIG. 11 is a diagram showing one example of the control characteristics of the variable fuel regulator shown in FIG. 3.

FIG. 11 is a graph showing a fuel pressure vs. fuel return amount (escaped amount of fuel) characteristic with a parameter of duty value in the variable P/Reg 513. In FIG. 10, when the revolution rate of the engine is N3, the amount of fuel discharged from the pump is Q. In FIG. 9, at the operating point indicated by broken lines, when the revolution rate of the engine is N3, the torque is T2, or the amount of injected fuel is q2. The fuel return amount Qret in the variable P/Reg 513 is expressed by Qret=(Amount of fuel discharged from pump)−(amount of injected fuel)

At the above operating point, since the amount of fuel discharged is Q, and the amount of injected fuel in all cylinders is q2, the fuel return amount Qret can be definitely calculated from the relation of Qret=Q−q2. In addition, since the fundamental duty value at the operating point N3, T2 is 60% with reference to FIG. 8, the fuel pressure Pset in the pipe 542 at the above operating point can be determined from the intersection point between the return amount Qret line and the fundamental duty 60% line with reference to FIG. 11. Particularly, from FIG. 9 it will be understood that the fundamental duty value can be determined on the basis of the revolution rate of engine and the amount of injected fuel.

The operation of the control unit 515 will be described with respect to time from the start of engine.

Before the start of engine, since the control unit 515 supplies no control signal to the variable P/Reg 513, the variable P/Reg 513 is the minimum, or zero in its opening area, and thus the amount of fuel to be returned to the pipe 541 from the pipe 542 through the pipe 541a is zero.

Figure 12:
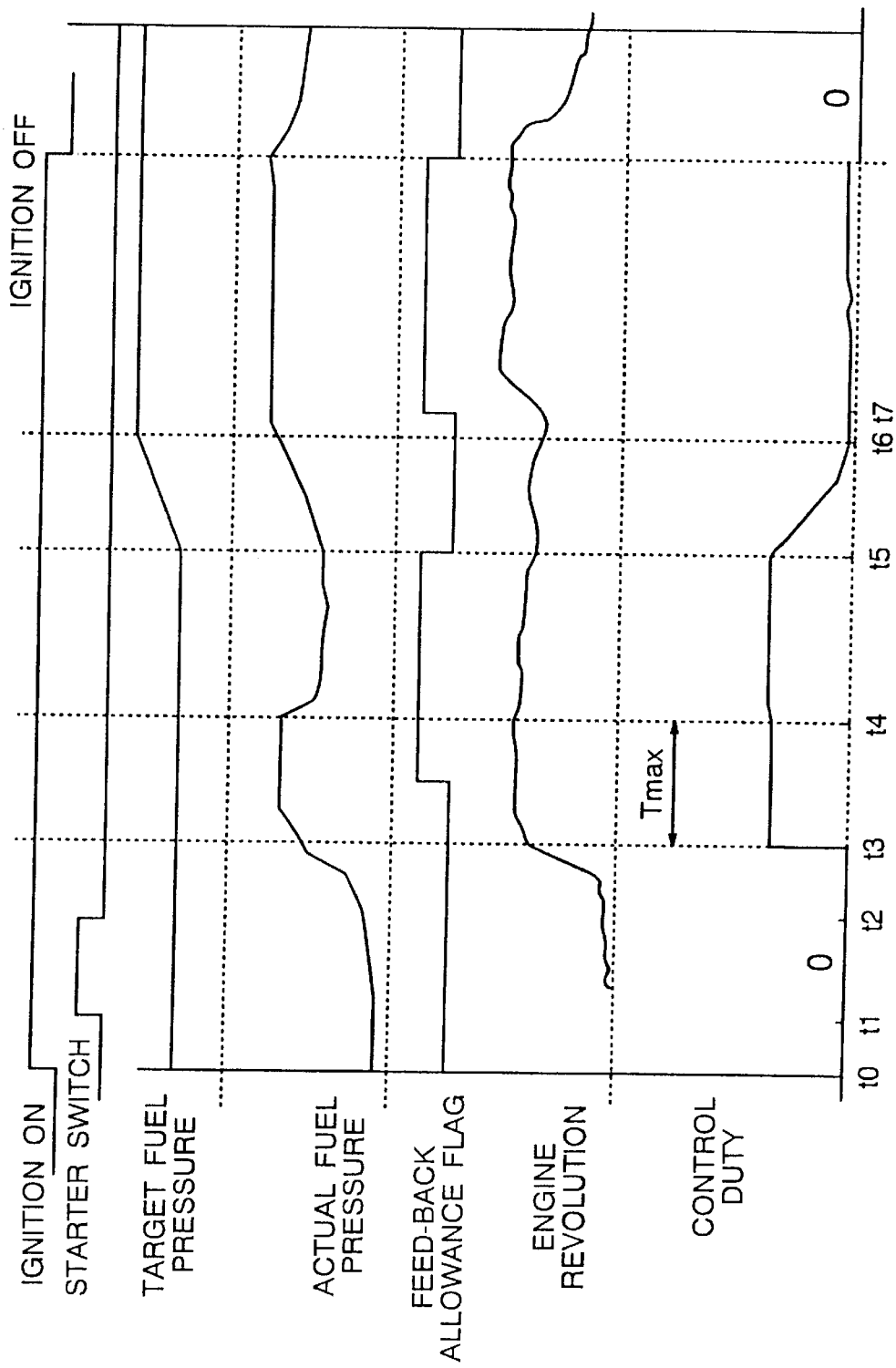
FIG. 12 is a timing chart to which reference is made in explaining the operation of the invention.
Figure 13:
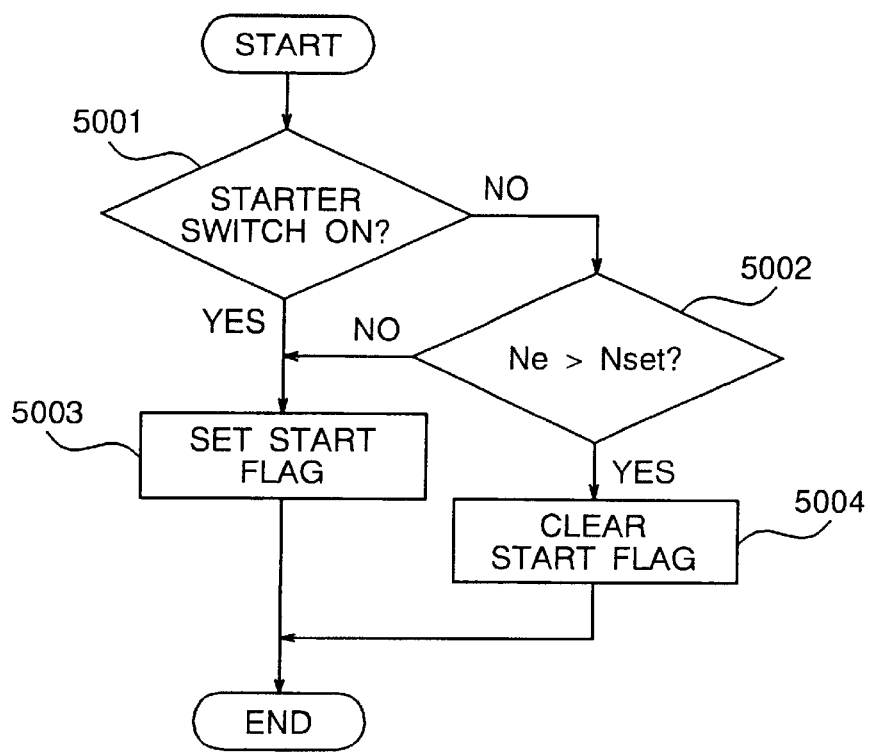
FIGS. 13 to 15 are flowcharts to which reference is made in explaining an example of the operation of the invention at the start time of engine.
Figure 14:
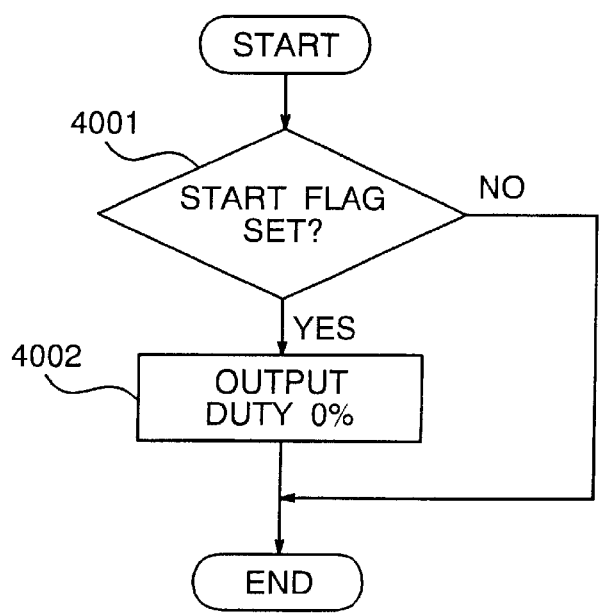

Under this condition, at time t0 in FIG. 12, when the ignition switch is turned on, the operation flows shown in FIGS. 13 and 14 are started predetermined times later. In the flow of FIG. 13, at step 5001 decision is made of whether the starter switch is turned from on-state to off-state. Since the starter switch is now in the off state, the decision is No, and thus the program goes to step 5002. At step 5002, decision is made of whether the engine speed Ne is larger than a revolution rate Nset. Since the engine is now not started yet, the decision is No, and thus the program goes to step 5003, where the start flag is set. Then, the program ends this flow.

When the operation flow in FIG. 14 is started, at step 4001 decision is made of whether the start flag set at step 5003 in FIG. 3 is set or not. Since the start flag is now set, the decision is Yes, and thus the program goes to step 4002, where the output from the output duty calculating means 106 is set at 0%. Then, the program ends this flow.

When the starter switch is turned on at time t1 in FIG. 12, at step 5001 in FIG. 13 the decision is Yes, and the start flag is set. Then, when the starter switch is turned off at time t2, at this step the decision is No, and the program goes to step 5002. At step 5002, the decision is No when the engine speed Ne is not larger than the predetermine value Nset, and thus the start flag is kept set. Therefore, as in the operation flow shown in FIG. 14, the output duty value of the variable P/Reg 513 is maintained to be 0%. If at step 5002 the engine speed Ne is decided to have reached the predetermined value or above (time t3), or if the engine is decided to have started, or be Yes, the program goes to step 5004, where the start flag is cleared. Then, the program ends this flow. Thereafter, as long as the revolution rate Ne is maintained to be the predetermined value Nset or above, the start flag is continuously cleared at step 5004. After the start flag is cleared, at step 4001 in FIG. 15 the decision is No, and the program ends this flow. Thus, at time t3, the control for the output duty value of 0% ends.

The operations shown in FIGS. 13 and 14 are useful for explaining the operation of the output duty calculating means 106 in FIG. 6. Thus, since the fuel pressure within the pipe 542 is low when the engine is started, the output duty calculating means 106 controls the duty to be 0% so that the fuel discharged from the pump 511 is not again returned to the pipe 541 side by the variable P/Reg 513, and the pressure within the pipe 542 to fast increase, thus swiftly bringing about the state in which normal fuel injection can be made.

In this way, the engine ends the start condition at time t3, but the actual fuel pressure is not stabilized yet. When the feed-back control is immediately performed from this state, the engine operation may become unstable. Thus, in this embodiment, the feed-back control is not executed until it is confirmed that the actual fuel pressure within the pipe 542 is kept stable over a predetermined time.

Figure 15:
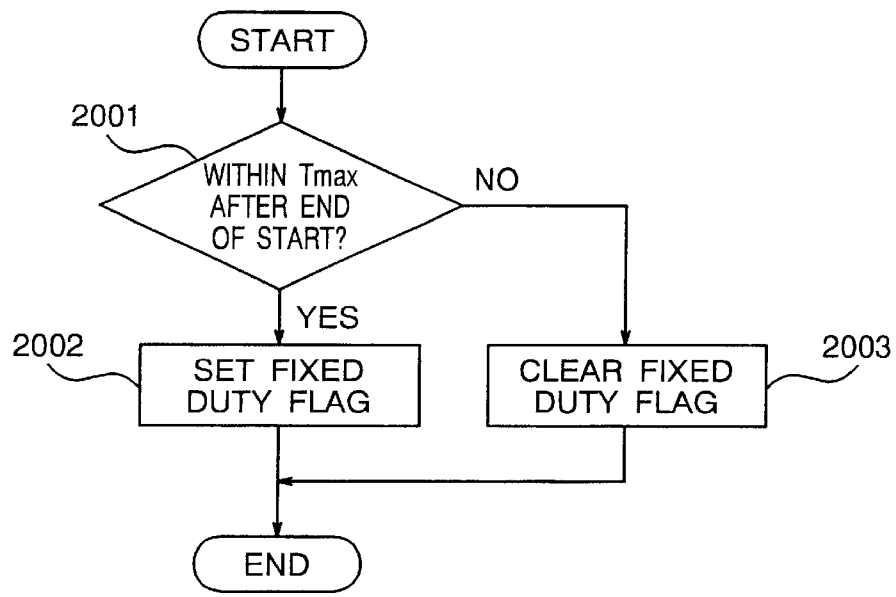

FIG. 15 shows the operation flow that is executed in parallel with the above operation. A fixed duty flag is raised for a certain time Tmax after the starting state end time t3, and the variable P/Reg 513 is controlled by the fixed duty. The fixed duty may be replaced by the fundamental duty. In this case, the fuel pressure correction calculating means 104 does not produce any amount of correction, and the fundamental duty itself is supplied to the output duty calculating means 106 so that the feed-forward control is performed. The operation flow of FIG. 15 is started every certain time.

Figure 16:
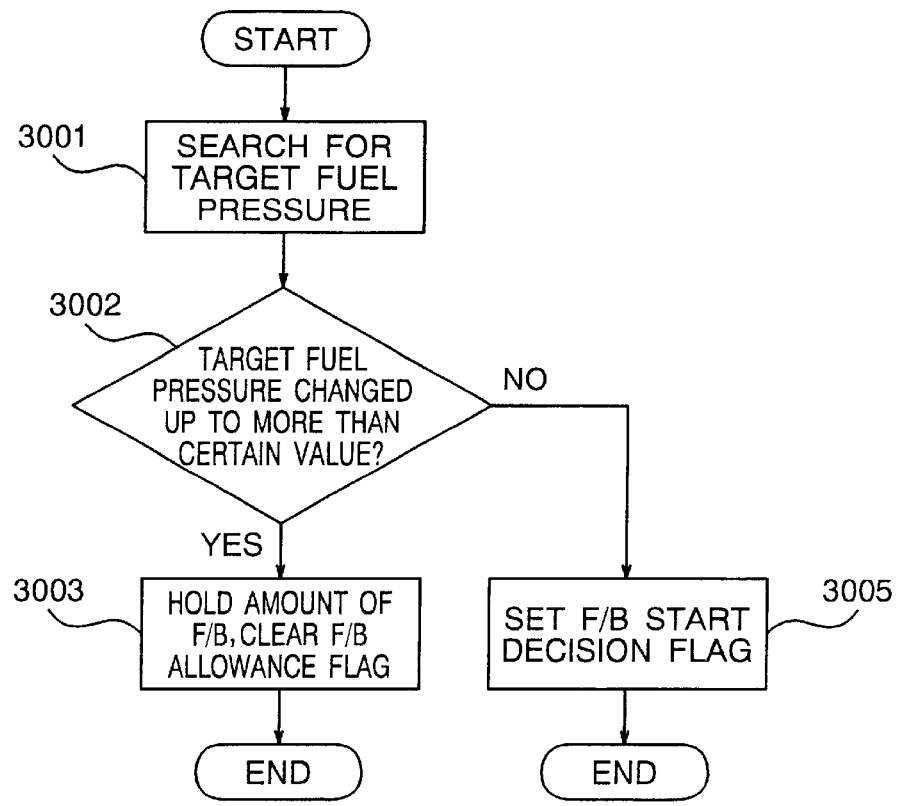
FIGS. 16 and 17 are flowcharts to which reference is made in explaining the operation in the case where the target value is greatly changed in the fuel pressure control apparatus of the invention.
Figure 17:
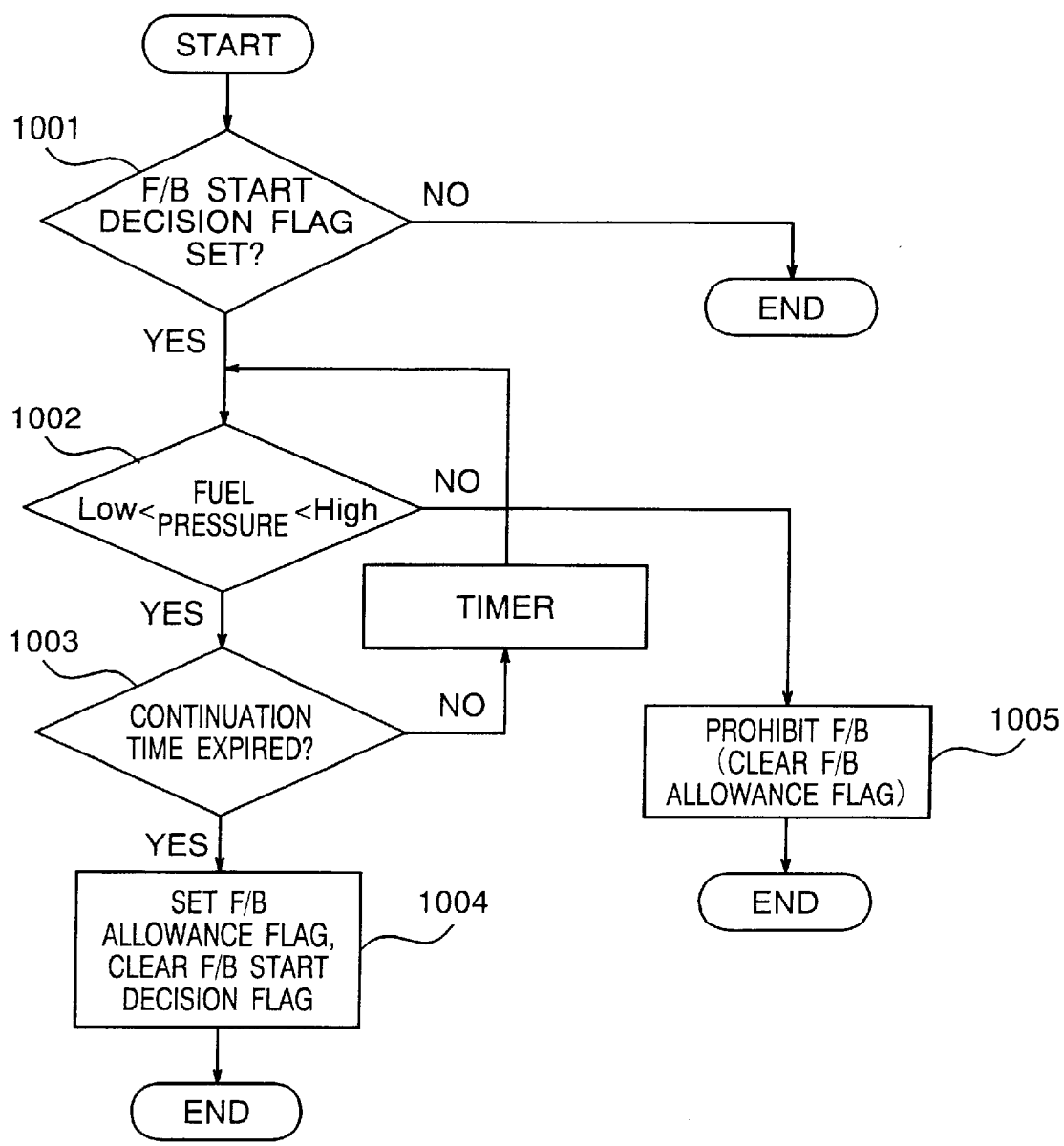

With reference to FIGS. 16 and 17, a description will be made of the operation flow for confirming that the actual fuel pressure has been maintained stable within a certain range for a predetermined period of time.

FIG. 16 shows the operation flow which is started every certain time to detect that the target fuel pressure has been greatly changed to exceed a predetermined value. Referring to FIG. 16, when this operation flow starts, first at step 3001 a target fuel pressure value is searched for from the target fuel pressure calculating means 102. At step 3002, the searched target fuel pressure value is compared with the previous one so that decision is made of whether it is equal to or larger than that. Since the flow is now between time t3 and time t4, the target fuel pressure is not greatly changed. Here, the decision is No, and at step 3005 the feed-back start decision flag is set. Then, the program ends this flow.

FIG. 17 shows the operation flow which is started every predetermined time to confirm that the actual fuel pressure has been maintained stable for a certain time and execute the feed-back control. Referring to FIG. 17, when this flow is started, at step 1001 decision is made of whether the feed-back decision flag that is to be set at step 3005 in FIG. 16 is set or not. Since the feed-back start decision flag is now set, the decision at step 1001 is Yes. At step 1002, decision is made of whether the actual fuel pressure is between the upper limit High and the lower limit Low, or whether the actual fuel pressure has been maintained stable within a predetermined range. Here, if the decision is No, at step 1005 the feed-back operation is not allowed, and the feed-back allowance flag is cleared. Then, the program ends this flow. If the decision at step 1002 is Yes, at step 1003 decision is made of whether the actual fuel pressure has been maintained stable for a predetermined time. Here, if the decision is No, a timer makes continuous counting, and the program goes back to step 1002. Thus, the above operation is repeated. If the decision at step 1003 is Yes, the program goes to step 1004, where the feed-back allowance flag is set, and the feed-back start decision flag is cleared. Then, the program ends this flow.

When the feed-back allowance flag is set, the feed-back control is performed under normal conditions, but at the start time the feed-back control is not started when the operation flow in FIG. 15 is before time t4. When the feed-back start decision flag is set at step 3005, and when time t4 has passed, the feed-back control is executed.

While the feed-back control is being performed, the fuel pressure correction calculating means 104 calculates the deviation $\Delta P$ between the target fuel pressure obtained by the target fuel pressure calculating means 102 and the actual fuel pressure detected by the fuel pressure sensor 523, and multiplies this deviation by a predetermined value to produce a proportional control amount Pc. In addition, when this deviation $\Delta P$ is larger than a predetermined value (for example, 5 Kg/m$^2$), a fixed value is added to the previous integral control amount to produce an integral control amount Ic. Then, the sum of the proportional control amount Pc and the integral control amount Ic is produced as an amount of feed-back control. The fundamental duty correction means 107 corrects the fundamental duty value from the fundamental duty calculating means 101 with the amount of feed-back control from the fuel pressure correction calculating means 104, and supplies the corrected duty value to the output control means 513.

When, during the execution of the feed-back control, it is detected that the target fuel pressure at step 3002 in FIG. 16 has been changed to be larger than a predetermined value as shown after time t5 in FIG. 12, the decision at this step is Yes, and the program goes to step 3003. At this step, the amount of feed-back at that time, or the output from the fuel pressure correction calculating means 104 at that time is stored in a memory 110, and the feed-back allowance flag is cleared. Then, the program ends this flow. When the feed-back allowance flag is cleared, the feed-back control is stopped, and the fuel pressure correction calculating means 104 does not supply the amount of correction to the fundamental duty correcting means 107. The period of this feed-forward control corresponds to the period from time t5 to time t7 in FIG. 12. During this period, the feed-forward control is performed on the basis of the duty value that is the sum of the fundamental duty value and the amount of feed-back stored at step 3003.

Under this feed-forward control, when the target fuel pressure is decided to have changed less than or equal to a predetermined value at step 3002 in FIG. 16, the feed-back start decision flag is set at step 3005. Thus, at step 1001 in FIG. 17, the decision is Yes. At step 1002 and the following steps, it is confirmed that the actual fuel pressure has been maintained stable within a certain range and the feed-back allowance flag is set as in the above description. As a result, the feed-back control is again started from time t7 in FIG. 12.

Figure 18:
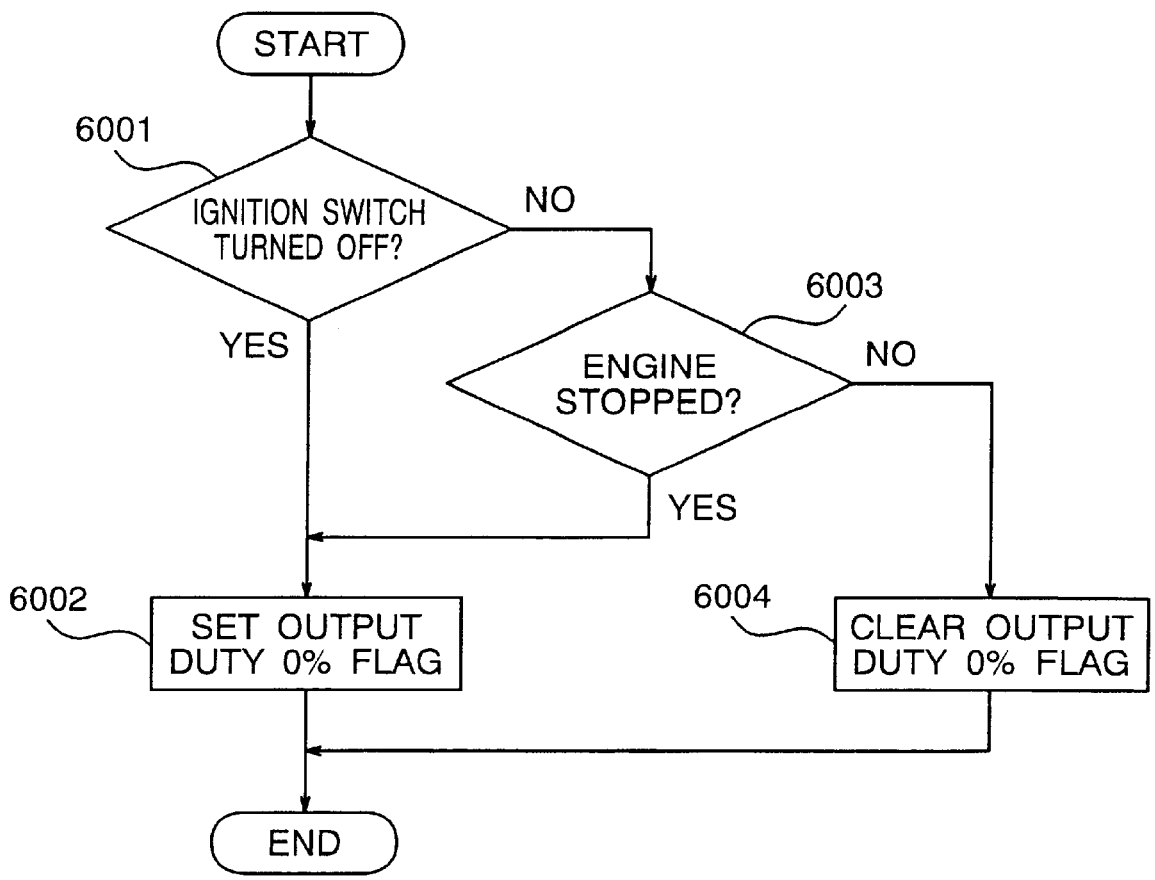
FIG. 18 is a flowchart showing one example of the operation of the invention in the case where the engine is stopped.

It is desired that the fuel pressure within the pipe 542 be kept high considering the case in which the engine is stopped for some reason and again started. FIG. 18 shows the operation flow for maintaining the fuel pressure high when the engine is stopped. This operation is performed by the output duty calculating means 106.

Referring to FIG. 18, first at step 6001 decision is made of whether the ignition switch is turned off from the on state. Here, if the decision is Yes, the output duty 0% flag is set first of all at step 6002, considering the case where the engine is started immediately after the stop of the engine. Consequently, the output duty calculating means 106 controls to makes the following control duty 0%, and maintain the pressure within the pipe 542 to be left unchanged. If the ignition switch is not turned off, the decision at step 6001 is No. At step 6003, decision is made of whether the engine is stopped. If the decision here is Yes, the program goes to step 6002, where the output duty 0% flag is set considering the case in which the engine is immediately again started. The output duty calculating means 106 makes the following control duty 0%, and maintains the pressure within the pipe 542 left unchanged. If the decision at step 6003 is No, the program goes to step 6004, where the output duty 0% flag is cleared. Then, the program ends this flow.

Figure 19:
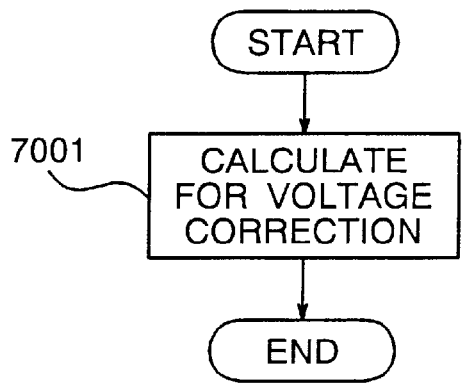
FIG. 19 is a flowchart to which reference is made in explaining one example of the operation for the compensation of battery voltage change.

The battery voltage is changed at low temperatures or by its deterioration due to the change with lapse of time. The characteristic of the relation between control duty and fuel pressure is changed depending on the battery voltage as described with reference to FIG. 5. Therefore, when the battery voltage is reduced to be smaller than the normal value, it is necessary to compensate for that change. FIG. 19 shows the flow for the compensation. This flow is started every predetermined time to be performed by the output duty calculating means 106. At step 7001, computation is made for the correction of the battery voltage. In this correction computation, since the fundamental duty is defined on the basis of the battery voltage, the output duty value is corrected by the actual battery voltage. In other words, the corrected duty Dout can be expressed by $$Dout=Dc \times (Vbase/Vb)$$

where Dc is the output duty, Vbase is the reference battery voltage, and Vb is the actual battery voltage.

When the minimum fuel injection condition corresponding to substantially zero fuel injection is satisfied, the F/C signal indicating fuel cut is generated, thus controlling the control duty value to be 100%, and the opening area of variable P/Reg 513 to be the maximum. Under this condition, the fuel pressure within the pipe is not under a particular control, and the injector 508 injects no fuel. Therefore, since the fuel discharge area is the maximum, the abrasion powder discharged from the pump 511 and dust flowing into the pipe 542 can be removed through the variable P/Reg 513 particularly from the valve seat 700 and ball valve. This operation is performed by the output duty calculating means 106. The operation will be described with reference to FIGS. 20 to 22.

Figure 20:
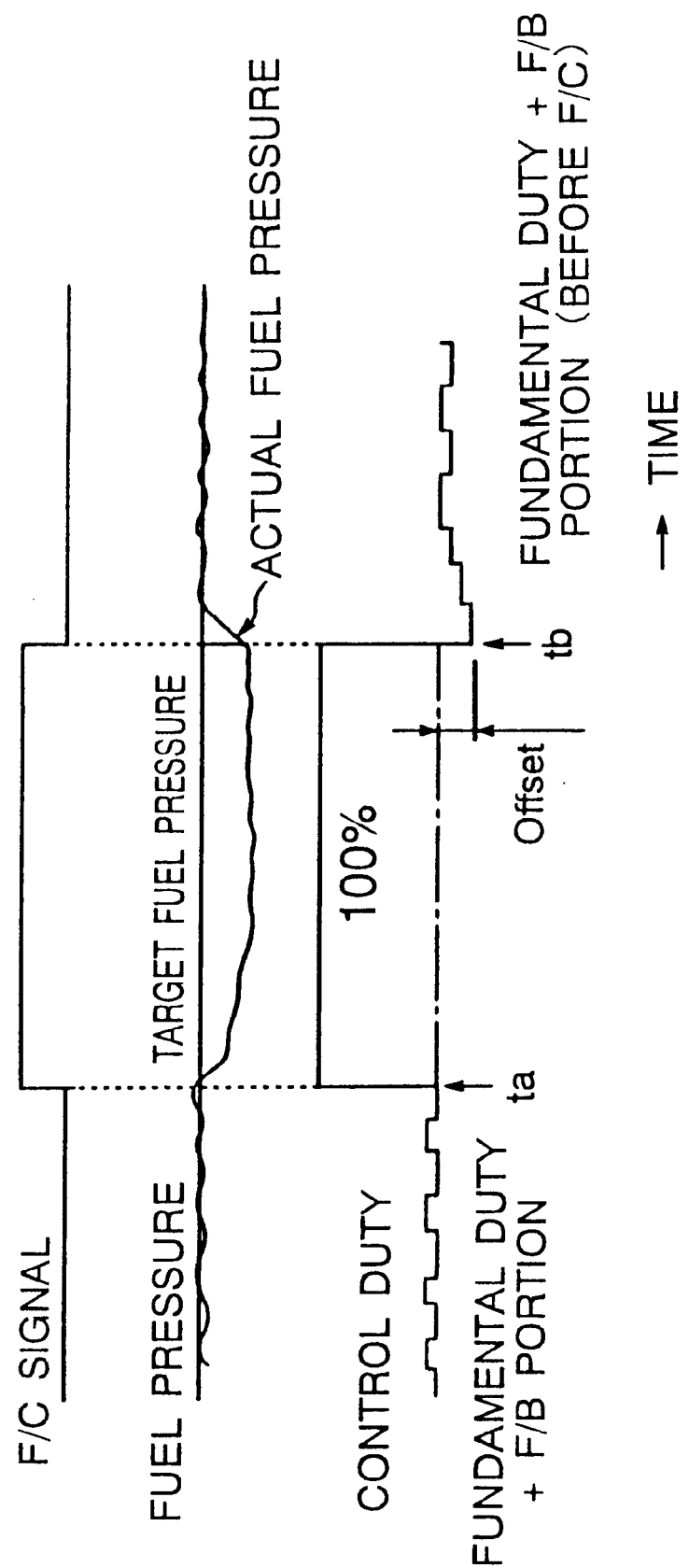
FIG. 20 is a timing chart to which reference is made in explaining the operation at the time of fuel cut.

When the F/C signal is received at time ta so that the duty value of 100% is brought about, the actual fuel pressure is decreased away from the target value after that time point as shown in FIG. 20. Then, when the F/C signal falls off at time tb, the actual fuel pressure cannot be suddenly shifted from the lower value to the target value set in the feed-back control even if the same amount of control as when the F/C signal is generated is applied. As indicated at time tb and the following in FIG. 20, the fuel pressure gradually approaches to the target value with a time lag. Since it is desired that the actual fuel pressure swiftly follow the target value in the engine control, it is necessary to fast remove the time lag. The output duty calculating means 106 controls the lag in the fuel pressure restoration to be the minimum when the original state is recovered from the F/C state. That is, the final control duty value is given an offset to be small, accelerating the fuel pressure restoration.

Figure 21:
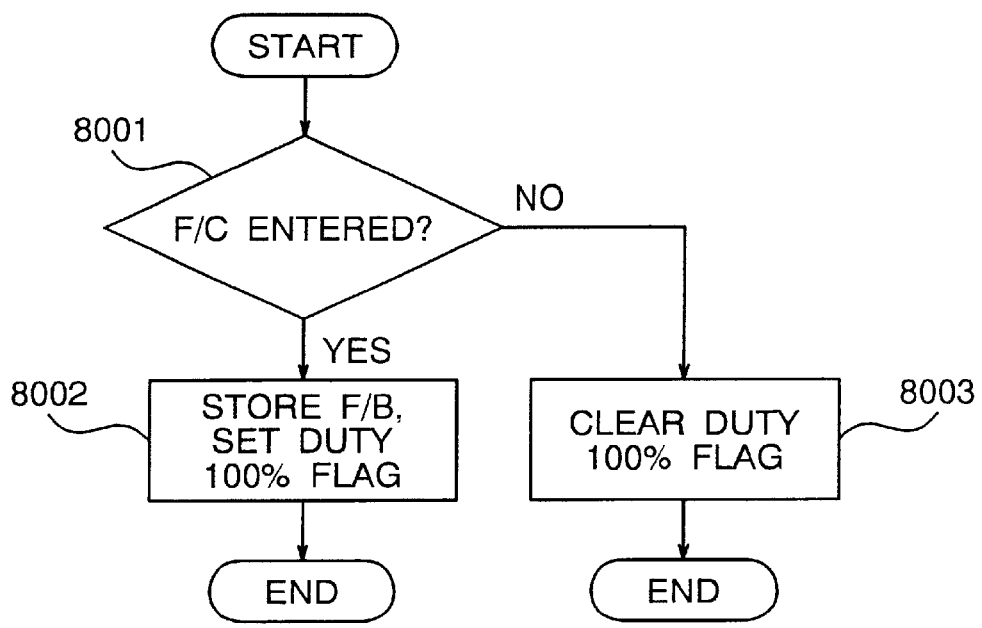
FIGS. 21 and 22 are flowcharts showing one example of the operation at the time of fuel cut.

FIG. 21 is the operation flow which is started every predetermined time to detect the F/C signal at time ta. When this operation is started, decision is made of whether the F/C signal is applied or not at step 8001. If the decision here is Yes, the program goes to step 8002, where the amount of feed-back, F/B produced from the fuel pressure correction calculating means 104 at that time is stored in the memory 110, and the duty 100% flag is set. Then, the program ends this flow. If the decision at step 8001 is No, the program goes to step 8003, where the duty 100% flag is cleared. Then, the program ends this flow. While the duty 100% flag is set and maintained to be left unchanged at step 8002, the output duty calculating means 106 causes the variable P/Reg 513 to operate at duty 100%, and the abrasion powder and dust to be quickly removed from the pipe 542 and variable P/Reg 513.

Figure 22:
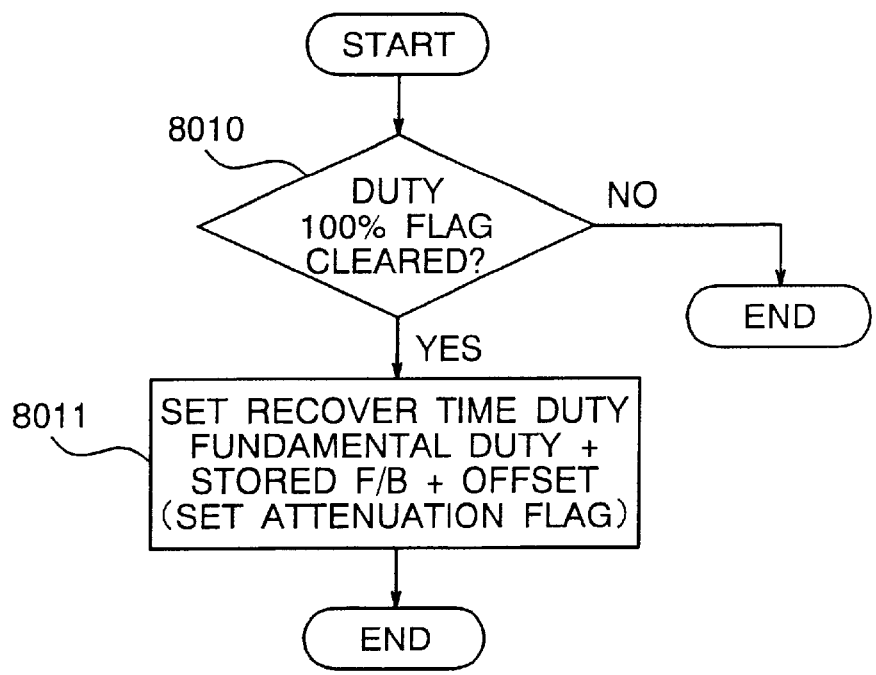

FIG. 22 shows the operation flow at tb at which the F/C signal falls off. When this flow is started, at step 8010 decision is made of whether the duty 100% flag to be set at step 8002 in FIG. 21 is once set and then cleared. If the decision here is No, the program ends this flow. If the decision is Yes, the F/C signal falls off at time tb, and thus at step 8011 the duty is set at the recovery time. The recovery-time duty is determined by adding the fundamental duty produced from the fundamental duty calculating means 101 at that time, the feed-back amount F/B stored in the memory at step 8002 in FIG. 21, and a predetermined offset for reducing the control duty value. Since the feed-back control on the fuel pressure is performed on the duty value determined in this way, the fuel pressure within the pipe 542 can be quickly restored by applying this offset. The offset is empirically determined. In addition, the offset can be released from when the fuel pressure is well recovered.

Figure 23:
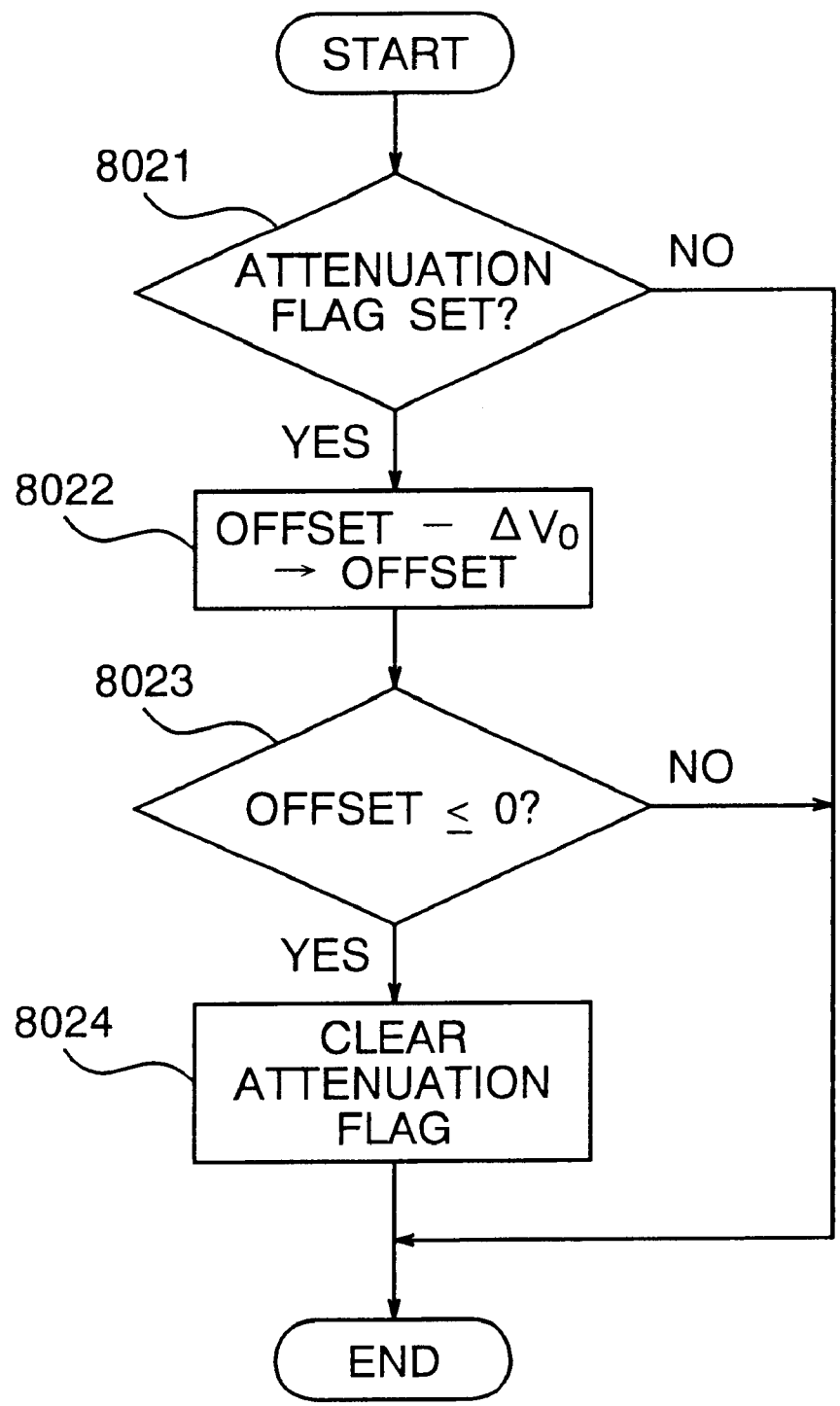
FIG. 23 is a flowchart showing an example different from that shown in FIG. 22.

The offset can be gradually decreased with the lapse of time, and finally made zero. FIG. 23 shows the operation flow for making this operation. Before this operation flow is executed, the attenuation flag is set at step 8011 in FIG. 22. Then, the flow of FIG. 23 is started. First at step 8021, it is checked if the attenuation flag is set at step 8021. If the decision here is No, this flow ends. If the decision is Yes, the program goes to step 8022, where a minute amount of offset is subtracted from the current offset, and the remainder, or new offset is set. Then, at step 8023, decision is made of whether the new offset has become zero or negative. If the decision here is No, this flow ends. If the decision is Yes, the offset can be considered to be substantially zero, the program goes to step 8024, where the attenuation flag is cleared. Then, this flow ends. At step 8023 the offset may be compared with a certain small value in place of zero. Since the operation flow of FIG. 23 is repeatedly performed every predetermined time, the offset of the control duty is reduced stepwise as shown in FIG. 20 after time tb.

What is claimed is:

1. A fuel pressure control apparatus for cylinder injection engine comprising:

fuel injection valve for injecting fuel into a cylinder of an engine;

pipe for conducting said fuel to said fuel injection valve;

a fuel pump for supplying said fuel from a fuel supply system into said pipe;

a fuel pressure regulator for regulating the fuel pressure within said pipe by discharging said fuel from said pipe to said fuel supply system; and a control unit for controlling the fuel pressure within said pipe, in a feed-back control during normal conditions and in a feed-forward control during at least a portion of a period in which the fuel pressure within said pipe transiently changes, by supplying a control signal determined on an engine operation parameter to said fuel pressure regulator, and for controlling said injection valve to determine an infected fuel amount according to an engine operation condition, wherein said fuel injection valve discharges an amount of fuel corresponding to a different value between a maximum pressure dependent on a maximum amount of fuel supplied by said fuel pump in said pipe and the fuel pressure determined by said control unit to said fuel supply system.

2. An apparatus according to claim 1, wherein feed-forward control is configured so that said fuel is not discharged from said pipe during a period of time from when said engine is started.

3. An apparatus according to claim 2, wherein said control unit produces a control signal for controlling the duty value of said fuel pressure regulator.

4. An apparatus according to claim 3, wherein said control unit controls the duty value of said fuel pressure regulator to be made zero.

5. An apparatus according to claim 2, wherein said starting operation is made when the driver turns the starter switch on.

6. An apparatus according to claim 2, wherein said period of time extends from said starting operation time to when said engine starts.

7. An apparatus according to claim 1, further comprising another regulator for limiting said fuel pressure not to increase when the fuel pressure within said pipe exceeds a predetermined value.

8. An apparatus according to claim 1, wherein said control unit sets said control signal for a certain value and makes feed-forward control on said fuel pressure regulator during a predetermined time from when said engine is started.

9. An apparatus according to claim 1, wherein said engine operation parameter is the revolution rate of said engine and the load to said engine.

10. An apparatus according to claim 1, wherein said engine operation parameter is the revolution rate of said engine and the amount of injected fuel.

11. An apparatus according to claim 1, wherein said fuel pressure regulator is controlled in a feed-forward manner so that said fuel is not discharged from said pipe when said engine is stopped.

12. An apparatus according to claim 11, wherein said control unit generates a control signal for controlling the duty value of said fuel pressure regulator.

13. An apparatus according to claim 12, wherein said control unit controls said duty value of said fuel pressure regulator to be 0%.

14. A fuel pressure control, for cylinder injection engine comprising:

fuel injection valve for injecting fuel into a cylinder of an engine;

pipe for conducting said fuel to said fuel injection valve;

a fuel pump for supplying said fuel from a fuel supply system into said pipe;

a fuel pressure regulator for regulating the fuel pressure within said pipe by discharging said fuel from said pipe to said fuel supply system; and a control unit for controlling the fuel pressure within said pipe in a feed-back manner by supplying a control signal determined on an engine operation parameter to said fuel pressure regulator, wherein said control unit makes feed-forward control on said fuel pressure regulator according to a fixed value during at least part of a period in which the fuel pressure within said pipe transiently changes, wherein said feed-forward control means for controlling said fuel pressure regulator in a feed-forward manner by use of a certain control signal that causes said fuel pressure regulator to be substantially released from and the fuel within said pipe to be discharged into said fuel supply system when it is detected that the injection of fuel from said fuel injection valve is interrupted.

15. An apparatus according to claim 14, wherein said control unit generates a control signal for controlling the duty value of said fuel pressure regulator.

16. An apparatus according to claim 15, wherein said control unit controls said duty value of said fuel pressure regulator to be made substantially 100%.

17. An apparatus according to claim 1, wherein said control unit generates a control signal for controlling the duty value of said fuel pressure regulator.

18. An apparatus according to claim 17, wherein said control unit has means for storing a battery voltage and means for correcting said control signal on the basis of the ratio between said battery voltage and a certain reference battery voltage.

19. A fuel pressure control apparatus for cylinder injection engine comprising:

a fuel injection valve for injecting fuel into a cylinder of an engine;

a pipe for conducting said fuel to said fuel injection valve;

a fuel pump for supplying said fuel from a fuel supply system into said pipe;

a fuel pressure regulator for regulating the fuel pressure within said pipe by discharging said fuel from said pipe to said fuel supply system; and a control unit for controlling the fuel pressure within said pipe by supplying to said fuel pressure regulator a control signal determined on the basis of an engine operation parameter, said control unit comprising:

fundamental control signal determining means for determining a fundamental control signal on the basis of said engine operation parameter;

target fuel pressure determining means for determining the target fuel pressure within said pipe on the basis of said engine operation parameter;

correction signal calculating means for calculating a correcting signal for correcting said fundamental control signal on the basis of the deviation between said target fuel pressure and the actual fuel pressure within said pipe;

feed-back control means for making feed-back control on said fuel pressure regulator on the basis of a control signal obtained by correcting said fundamental control signal with said correction signal;

transient change detecting means for detecting the transient change of the fuel pressure within said pipe; and feed-forward control means for making feed-forward control on said fuel pressure regulator on the basis of said fundamental control signal during the time from when the transient change is detected by said detecting means to when said transient change is removed.

20. An apparatus according to claim 19, wherein said engine operation parameter is the revolution rate of said engine and the load to said engine.

21. An apparatus according to claim 20, wherein the load to said engine is an amount of fuel injected from said fuel injection valve.

22. An apparatus according to claim 19, wherein said correction signal calculating means has limiter process means for limiting said correction signal to a predetermined upper limit or lower limit, and producing the limited signal.

23. An apparatus according to claim 19, wherein said transient change detecting means is a start detecting means for detecting the state in which said engine is started.

24. An apparatus according to claim 23, wherein said control unit further comprises means for executing said feed-forward control during a certain time from when said start detecting means detects the start of said engine.

25. An apparatus according to claim 19, wherein said transient change detecting means is means for detecting that said target fuel pressure has suddenly changed when said feed-back control is executed.

26. An apparatus according to claim 25, wherein said control unit further comprises means for causing said correction signal from said correction signal calculating means to be stored in a memory when said transient change detecting means detects the sudden change of said target fuel pressure.

27. An apparatus according to claim 26, wherein said feed-forward control means is means for producing as said control signal a signal obtained by correcting said fundamental control signal with the correction signal stored in said memory.

28. An apparatus according to claim 19, wherein said feed-forward control means has feed-back allowance deciding means for detecting that said actual fuel pressure has been maintained within a predetermined range for a certain time.

29. An apparatus according to claim 28, wherein said control unit further comprises means for interrupting said feed-forward control and executing said feed-back control in response to said fact detected by said allowance decision means.

30. A fuel pressure control apparatus for cylinder injection engine comprising:
   a fuel injection valve for injecting fuel into a cylinder of an engine;
   a pipe for conducting said fuel to said fuel injection valve;
   a fuel pump for supplying said fuel from a fuel supply system to said pipe;
   a fuel pressure regulator for regulating the fuel pressure within said pipe by discharging said fuel from said pipe to said fuel supply system; and
   a control unit for controlling the fuel pressure within said pipe by applying a control signal determined on the basis of an engine operation parameter to said fuel pressure regulator; said control unit comprising:
      fundamental control signal determining means for determining a fundamental control signal on the basis of said engine operation parameter;
      target fuel pressure determining means for determining the target fuel pressure within said pipe on the basis of said engine operation parameter;
      correction signal calculating means for calculating a correction signal for correcting said fundamental control signal on the basis of the deviation between said target fuel pressure and the actual fuel pressure within said pipe;
      feed-back control means for making feed-back control on said fuel pressure regulator on the basis of a control signal obtained by correcting said fundamental control signal with said correction signal;
      fuel cut detecting means for detecting that said fuel injection valve has interrupted fuel injection; and
      feed-forward control means for making feed-forward control on said fuel pressure regulator so that substantially the maximum amount of discharged fuel can be achieved when said fuel cut detecting means detects the interruption of fuel injection.

31. An apparatus according to claim 30, wherein said control unit further comprises feed-back recover means for interrupting said feed-forward control and execute said feed-back control when said interruption of fuel injection is released from.

32. An apparatus according to claim 31, wherein said feed-forward control means has means for causing a memory to store a correction signal calculated by said correction signal calculating means when said fuel cut detecting means has detected the interruption of fuel injection, and said feed-back recover means has means for correcting the fundamental control signal from said fundamental control signal determining means with said correction signal stored in said memory.

33. An apparatus according to claim 31, wherein said feed-back recovery means has means for adding an offset signal to said fundamental control signal from said fundamental control signal determining means in order for said actual fuel pressure to be quickly approached to said target fuel pressure.

34. An apparatus according to claim 33, wherein said feed-back recover means has means for gradually decreasing said offset signal up to zero.

35. An apparatus according to claim 30, wherein said control signal controls the amount of fuel discharged from said pipe to said fuel supply system on the basis of a duty value, and said feed-forward control means controls said duty value to be substantially 100%.

* * * * *